(12) United States Patent
Hwang et al.

(10) Patent No.: US 7,498,560 B2
(45) Date of Patent: Mar. 3, 2009

(54) KEYPAD WITH OPTICAL WAVEGUIDE HAVING AT LEAST ONE PRISM PATTERN

(75) Inventors: Sun-Lyeong Hwang, Gumi-si (KR); Ki-Chan Kim, Gumi-si (KR)

(73) Assignee: Samsung Electronics Co. Ltd, Suwon, Gyeonggi-do (KR)

( * ) Notice: Subject to any disclaimer, the term of this patent is extended or adjusted under 35 U.S.C. 154(b) by 0 days.

(21) Appl. No.: 11/856,865

(22) Filed: Sep. 18, 2007

(65) Prior Publication Data

US 2008/0099668 A1    May 1, 2008

(30) Foreign Application Priority Data

Oct. 25, 2006    (KR) .................. 10-2006-0104037

(51) Int. Cl.
*H01J 40/14* (2006.01)
(52) U.S. Cl. ................. 250/221; 250/227.22
(58) Field of Classification Search ............... 250/221, 250/556, 227.22, 214 LS; 356/71; 382/124–127; 345/175, 176; 200/61.02
See application file for complete search history.

(56) References Cited

U.S. PATENT DOCUMENTS

| | | | | |
|---|---|---|---|---|
| 5,210,588 A | * | 5/1993 | Lee | 356/71 |
| 6,614,479 B1 | * | 9/2003 | Fukusho et al. | 348/340 |
| 6,665,427 B1 | * | 12/2003 | Keagy et al. | 382/124 |
| 6,891,962 B1 | * | 5/2005 | Kuno et al. | 382/127 |
| 7,158,659 B2 | * | 1/2007 | Baharav et al. | 382/124 |
| 2007/0057929 A1 | * | 3/2007 | Xie | 345/175 |

FOREIGN PATENT DOCUMENTS

| | | |
|---|---|---|
| JP | 14508105 T | 3/2002 |
| KR | 1020060090784 A | 8/2006 |
| KR | 100629053 B1 | 9/2006 |
| WO | WO 99/53431 A1 | 10/1999 |

* cited by examiner

*Primary Examiner*—Que T Le
(74) *Attorney, Agent, or Firm*—Jefferson IP Law, LLP

(57) ABSTRACT

A keypad is provided. The keypad includes an optical waveguide on the top surface of which at least one prism pattern is formed, a light source for generating light and causing the light to be incident to a side surface of the optical waveguide, and at least one optical detector located below the optical waveguide to correspond to the at least one prism pattern.

17 Claims, 3 Drawing Sheets

KEYPAD WITH OPTICAL WAVEGUIDE HAVING AT LEAST ONE PRISM PATTERN

PRIORITY

This application claims the benefit under 35 U.S.C. § 119(a) of a Korean Patent Application filed in the Korean Intellectual Property Office on Oct. 25, 2006 and assigned Ser. No. 2006-104037, the entire disclosure of which is hereby incorporated by reference.

BACKGROUND OF THE INVENTION

1. Field of the Invention

The present invention generally relates to a keypad. More particularly, the present invention relates to a keypad of a touch sensor type.

2. Description of the Related Art

A keypad for inputting characters and numbers and a keypad for selecting a direction for menu selection and cursor movement may be used for portable terminals, and a dome switch may be used for the keypad for direction selection. Recently, a thin keypad of a touch sensor type has been developed for use in compact and slim portable terminals.

FIG. 1 illustrates a conventional keypad 100 of a touch sensor type. Referring to FIG. 1, the keypad 100 includes a flexible resistive layer 110, a rigid resistive layer 120 facing the flexible resistive layer 110, an air gap 101 between the flexible resistive layer 110 and the rigid resistive layer 120, and support members 102a and 102b at both ends of the flexible resistive layer 110 and the rigid resistive layer 120.

Once the flexible resistive layer 110 is pressed by a user, a user's selection is detected and transmitted through a resistance change caused by the formation of a contact between the flexible resistive layer 110 and the rigid resistive layer 120. A keypad of an electrostatic capacitance touch sensor type that detects a position and a selection through a charge change caused by a user's touch has been suggested.

However, such a conventional keypad requires a separation interval for suppressing interference from adjacent keys and a pattern space at its edge, increasing the size of the keypad. Moreover, the conventional keypad may malfunction due to a sensitivity change.

SUMMARY OF THE INVENTION

An aspect of the present invention is to address at least the above problems and/or disadvantages and to provide at least the advantages described below. Accordingly, an aspect of the present invention is to provide a keypad that can minimize the occurrence of malfunctions and can be used in a compact and slim mobile terminal.

According to an aspect of the present invention, a keypad is provided. The keypad includes an optical waveguide on the top surface of which at least one prism pattern is formed, a light source for generating light and causing the light to be incident to a side surface of the optical waveguide, and optical detectors located below the optical waveguide to correspond to the at least one prism pattern.

According to another aspect of the present invention, a mobile terminal using the keypad is provided. The terminal comprises an antenna, a display unit and an input unit. The input unit includes an optical waveguide having at least one prism pattern on a top surface of the optical waveguide, a light source for generating light and causing the light to be incident to a side surface of the optical waveguide, and at least one optical detector located below the optical waveguide to correspond to the at least one prism pattern.

BRIEF DESCRIPTION OF THE DRAWINGS

The above and other aspects, features and advantages of certain exemplary embodiments of the present invention will be more apparent from the following detailed description taken in conjunction with the accompanying drawings, in which.

Throughout the drawings, like reference numerals will be understood to refer to like parts, components and structures.

DETAILED DESCRIPTION OF EXEMPLARY EMBODIMENTS

The following description with reference to the accompanying drawings is provided to assist in a comprehensive understanding of an exemplary embodiment of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Figure 1:
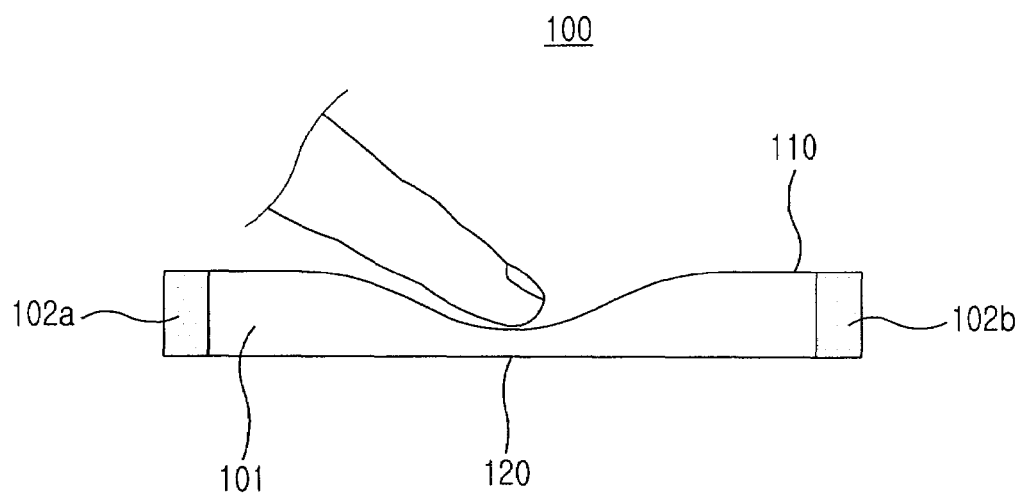
FIG. 1 illustrates the structure of a conventional keypad.
Figure 2:
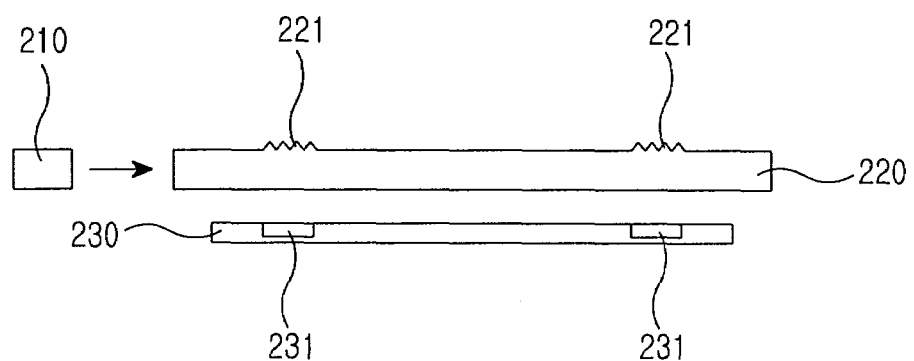
FIG. 2 illustrates a keypad according to an exemplary embodiment of the present invention.

FIG. 2 illustrates a keypad according to an exemplary embodiment of the present invention. Referring to FIG. 2, a keypad 200 of a touch sensor type according to an exemplary embodiment of the present invention includes an optical waveguide 220 on the top surface of which prism patterns 221 are formed, a light source 210 for generating light and making the light incident to a side surface of the optical waveguide 220, and optical detectors 231 corresponding to the prism patterns 221, which are located under the optical waveguide 220.

The optical detectors 231 may have been mounted on, integrated into, or arrayed on a substrate 230.

The light source 210 may be a light emitting diode for generating light in a near infrared wavelength band or in a visible-ray wavelength band and its light emitting surface faces the side surface of the optical waveguide 220. The wavelength band of the light source 210 may vary with the sensitivity characteristics of the optical detectors 231.

Figure 3:
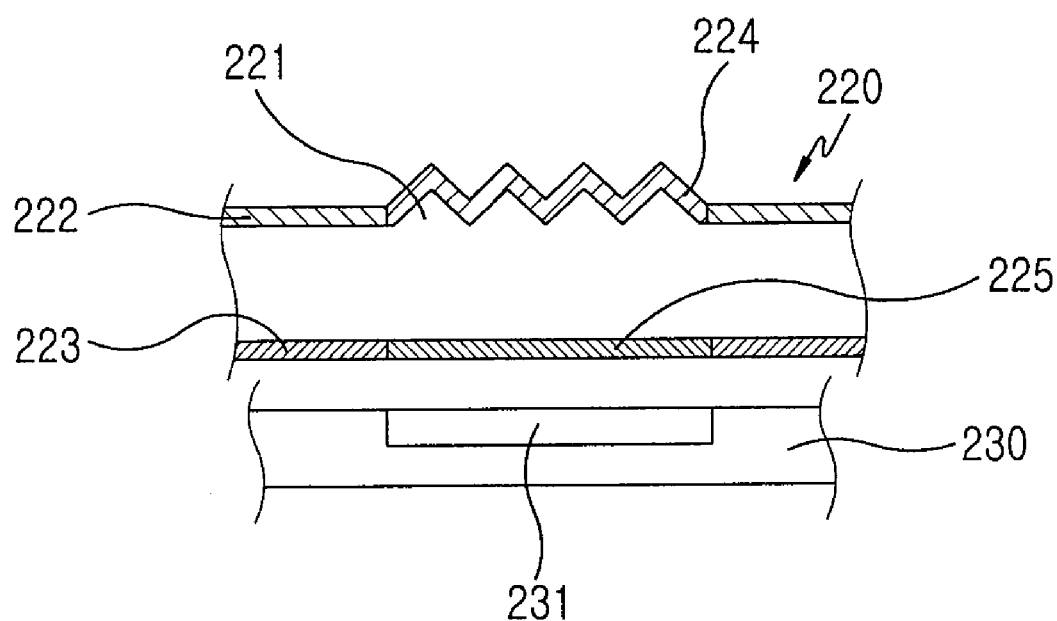
FIG. 3 is an enlarged view of a portion of the keypad illustrated in FIG. 2.

FIG. 3 is an enlarged view of a portion of the keypad 200. Referring to FIG. 3, the optical waveguide 220 includes an upper anti-reflective layer 224 formed on each of the prism patterns 221, an upper high-reflective layer 222 formed on the remaining region of each of the prism patterns 221 except for the region where the upper anti-reflective layer 224 is formed, a lower anti-reflective layer 225 formed on a bottom surface corresponding to the prism pattern 221, and a lower high-reflective layer 223 formed on the remaining region of the bottom surface except for the region where the lower anti-reflective layer 225 is formed.

The optical waveguide 220 totally reflects the incident light towards the other side surface and a portion of the incident light may be surface-emitted by the prism pattern 221. In the keypad 200 according to an exemplary embodiment of the present invention, the upper high-reflective layer 222 and the lower high-reflective layer 223 are formed in the remaining regions of the bottom surface and the top surface except for portions corresponding to the prism pattern 221, thereby minimizing a loss of the totally reflected light. Moreover, the optical detection efficiency of the optical detector 231 can be improved by the upper anti-reflective layer 224 formed on the prism pattern 221 and the lower anti-reflective layer 225 formed on the bottom surface corresponding to the prism pattern 221. In other words, the optical waveguide 220 can provide a backlight to the user through the prism pattern 221 and the prism pattern 221 may serve as a direction key or a key button having a desired character or number.

The total reflection condition can be satisfied by adjusting the light emitting angle of the light source 210 in such a way to satisfy the total reflection condition when the light emitted from the light source 210 is incident to the optical waveguide 220 or by forming the side surface of the optical waveguide 220 to which the light is incident to be inclined at a predetermined angle with respect to a direction perpendicular to an optical axis, i.e., at an angle that allows the incident angle of the light to satisfy the total reflection condition. The total reflection condition may be determined based on the wavelength of a light or the refractive index of a medium of the optical waveguide 220.

The prism pattern 221 may be formed as one piece with the optical waveguide 220 during molding of the optical waveguide 220 or may be formed by a scratch on the top surface of the optical waveguide 220.

Figure 4A:
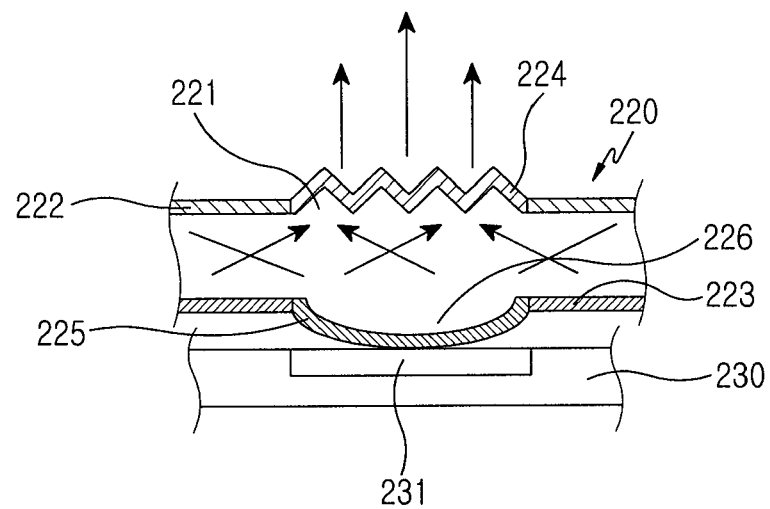
FIG. 4A illustrates another form of an optical waveguide illustrated in FIG. 2.

FIG. 4A is a view for explaining the path of light traveling inside the keypad 200 illustrated in FIG. 2, in which another form of the optical waveguide 220 is illustrated. Referring to FIG. 4A, a protrusion 226 is formed on the bottom surface of the optical waveguide 220 corresponding to the prism pattern 221 in such a way to correspond to and protrude towards the optical detector 231. Each protrusion 226 is disposed perpendicularly below the prism pattern 221 and each optical detector 231 is disposed perpendicularly below the protrusion 226.

The optical waveguide 220 illustrated in FIG. 3 or 4A guides the light from its one side surface to the other side surface and the prism pattern 221 can surface-emit a portion of the incident light.

Figure 4B:
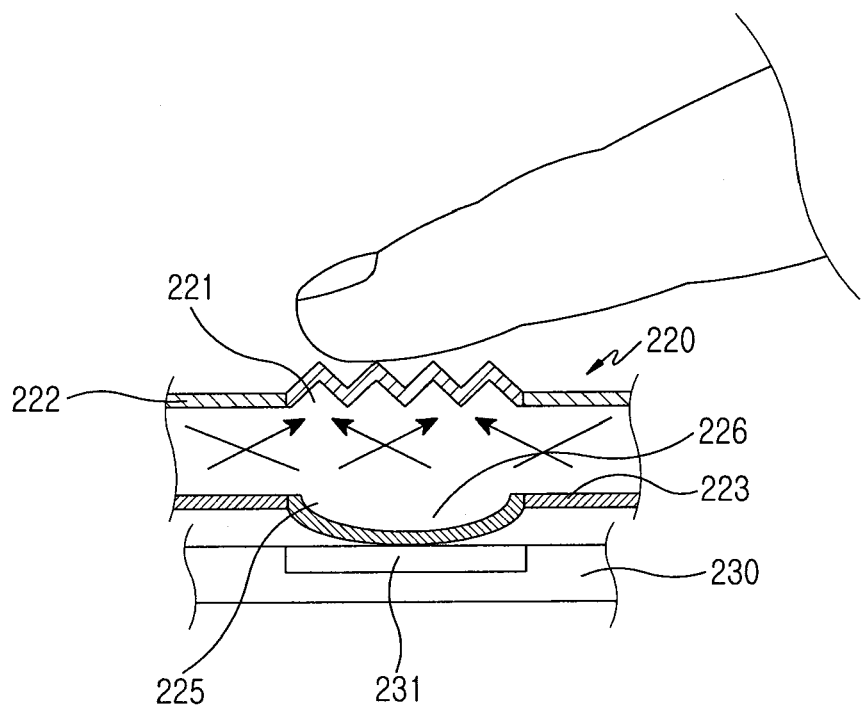
FIG. 4B is a view for explaining an operation when a user touches the keypad illustrated in FIG. 4A.

FIG. 4B is a view for explaining an operation when a user touches the keypad 200 illustrated in FIG. 4A. Referring to FIG. 4B, once the user selects one of the prism patterns 221, a portion of the light that is surface-emitted by the selected prism pattern 221 is reflected towards the optical detector 231 by the user who touches the prism pattern 221. In other words, the optical detector 231 detects the light reflected by the prism pattern 221.

The protrusion 226 is a type of lens having a curvature and converges the light reflected by the prism pattern 221 onto the optical detector 231. In other words, the protrusions 226 are formed in the shape of convex lenses while facing the optical detectors 231, thereby effectively converging the light reflected from a user's body to the optical detector 231 corresponding to the selected prism pattern 221. The curvature of each of the protrusions 226 may be determined based on the range of light reception of the optical detector 231 and the divergence angle of the light.

As described above, the keypad of a touch sensor type according to exemplary embodiments of the present invention can minimize the occurrence of malfunction and use a light source in various wavelength bands. Furthermore, the keypad can be used for a slim design and thus its various forms are applicable to mobile communication terminals with an antenna (not shown) and a display unit (not shown) or digital terminals.

While the invention has been shown and described with reference to exemplary embodiments thereof, it will be understood by those skilled in the art that various changes in form and details may be made therein without departing from the spirit and scope of the invention as defined by the appended claims and their equivalents.

What is claimed is:

1. A keypad comprising:
    an optical waveguide comprising at least one prism pattern on a top, external surface of the optical waveguide;
    a light source for generating light and causing the light to be incident to a side surface of the optical waveguide; and
    at least one optical detector located below the optical waveguide to correspond to the at least one prism pattern.

2. The keypad of claim 1, further comprising at least one protrusion on a bottom surface of the optical waveguide that corresponds to and protrudes toward the at least one optical detector.

3. The keypad of claim 1, further comprising an upper reflective layer on a remaining region of the top surface of the optical waveguide, except for a region where the at least one prism pattern is formed.

4. The keypad of claim 2, further comprising a lower reflective layer on a remaining region of the bottom surface of the optical waveguide, except for a region where the at least one protrusion is formed.

5. The keypad of claim 1, further comprising a light emitting diode for generating light in a near infrared wavelength band or in a visible-ray wavelength band.

6. The keypad of claim 3, further comprising an upper anti-reflective layer on the at least one prism pattern.

7. The keypad of claim 4, further comprising a lower anti-reflective layer on the at least one protrusion.

8. A keypad comprising:
    an optical waveguide comprising at least one prism pattern on a top, external surface thereof;
    a light source for generating light and causing the light to be incident to a side surface of the optical waveguide;
    at least one optical detector located below the optical waveguide to correspond to the at least one prism pattern; and
    at least one protrusion on a bottom surface of the optical waveguide in the shape of lenses having a curvature that corresponds to and protrudes toward the at least one optical detector.

9. The keypad of claim 8, wherein the at least one protrusion is formed in the shape of convex lenses.

10. A mobile terminal comprising:
    an antenna;
    a display unit; and
    an input unit comprising:
        an optical waveguide comprising at least one prism pattern on a top, external surface of the optical waveguide;
        a light source for generating light and causing the light to be incident to a side surface of the optical waveguide; and
        at least one optical detector located below the optical waveguide to correspond to the at least one prism pattern.

11. The mobile terminal of claim 10, further comprising at least one protrusion on a bottom surface of the optical waveguide that corresponds to and protrudes toward the at least one optical detector.

12. The mobile terminal of claim 10, further comprising an upper reflective layer on a remaining region of the top surface of the optical waveguide, except for a region where the at least one prism pattern is formed.

13. The mobile terminal of claim 11, further comprising a lower reflective layer on a remaining region of the bottom surface of the optical waveguide, except for a region where the at least one protrusion is formed.

14. The mobile terminal of claim 10, further comprising a light emitting diode for generating light in a near infrared wavelength band or in a visible-ray wavelength band.

15. The mobile terminal of claim 12, further comprising an upper anti-reflective layer on the at least one prism pattern.

16. The mobile terminal of claim 13, further comprising a lower anti-reflective layer on the at least one protrusion.

17. The mobile terminal of claim 11, wherein the at least one protrusion is formed in the shape of convex lenses.

* * * * *